(12) United States Patent
Sherron

(10) Patent No.: US 8,339,269 B2
(45) Date of Patent: Dec. 25, 2012

(54) ADJUSTABLE SENSOR FOR SENSING A LEVEL OF LIQUID

(76) Inventor: Mark Sherron, Harrisburg, PA (US)

( * ) Notice: Subject to any disclaimer, the term of this patent is extended or adjusted under 35 U.S.C. 154(b) by 457 days.

(21) Appl. No.: 12/719,492

(22) Filed: Mar. 8, 2010

(65) Prior Publication Data
US 2010/0231392 A1    Sep. 16, 2010

Related U.S. Application Data

(60) Provisional application No. 61/160,500, filed on Mar. 16, 2009.

(51) Int. Cl.
*G08B 21/00* (2006.01)
(52) U.S. Cl. ....................................................... 340/618
(58) Field of Classification Search .................. 340/618, 340/620, 623, 612, 603; 73/291, 304 R
See application file for complete search history.

(56) References Cited

U.S. PATENT DOCUMENTS

| | | | | |
|---|---|---|---|---|
| 4,258,444 A | * | 3/1981 | Orszullok | 4/538 |
| 4,757,305 A | * | 7/1988 | Peso | 340/624 |
| 4,804,947 A | * | 2/1989 | Geleziunas | 340/620 |
| 4,922,226 A | * | 5/1990 | Hsieh et al. | 340/521 |
| 5,661,462 A | * | 8/1997 | Shrewsbury-Gee | 340/618 |
| 6,008,728 A | * | 12/1999 | Wesey | 340/618 |
| 6,147,614 A | | 11/2000 | Parish | |
| 6,160,482 A | * | 12/2000 | Hill | 340/625 |
| 6,480,113 B1 | | 11/2002 | Esposito | |
| 6,956,486 B2 | | 10/2005 | King, Jr. | |
| 7,068,175 B1 | * | 6/2006 | Pennington | 340/623 |
| 7,350,245 B2 | | 4/2008 | Giagni | |
| 2002/0121982 A1 | | 9/2002 | Ferris et al. | |
| 2008/0235865 A1 | | 10/2008 | Smushkovich et al. | |

\* cited by examiner

*Primary Examiner* — Phung Nguyen

(57) ABSTRACT

A liquid level sensing device for sensing liquid in a container. The liquid level sensing device has a base and a rotatable member which extends from and is rotatable relative to the base. A cord extends from the rotatable member and has a sensor provided at a free end thereof. The sensor may be accurately positioned at various heights relative to a bottom of the container to allow a user to fill the container with the liquid to the desired level. An alarm and a signal transmitter are provided in electrical communication with the sensor, such that as a liquid is introduced to the container, the alarm and the signal transmitter will be activated when the level of the liquid reaches the sensor.

20 Claims, 4 Drawing Sheets

ADJUSTABLE SENSOR FOR SENSING A LEVEL OF LIQUID

FIELD OF THE INVENTION

The present invention is directed to devices for the detection of a surface level of water. More particularly, the invention is directed to an adjustable sensor device that will sound an alarm when a preset level of water is reached.

BACKGROUND OF THE INVENTION

The act of filling a bathtub has been a continued annoyance for generations. Bathtub filling often requires a long amount of time because of the amount of water required and the relatively slow flow rate of the water. During this tub filling time, the rising water level must be constantly observed so that the waiting bather can know when the bath water reaches the desired water level and avoid the occurrence of an overflow. However, few people have the patience to stand and wait for a tub to fill. The situation often results in a seemingly endless cycle of leaving and returning to check on the progress of the water level. In addition, parents with small children or people who are visually impaired have safety concerns which often require their continued presence as the water is filling the tub.

Various liquid level control devices and systems have been described in the prior art and widely used in households, hotels and other institutions. Some of these systems sound an alarm signal when the liquid reaches a certain level, while other systems operate on mechanical liquid level relief principles. Regardless of the control mode, the purpose is to assure safety of the person in a bathtub by alerting such person of the safety level of the liquid, and prevent damage to the floor which may result from liquid overflow.

One bath water level control system is described in U.S. Pat. No. 4,258,444 issued to Wily Orszullok on Mar. 31, 1981. That system is designed for exterior installation relative to the bathtubs and includes a probe or detecting means which is vertically adjustable on the exterior wall of the tub. When the water reaches a predetermined level, the probe emits a signal which activates a device to turn off the inflowing water and/or trip an alarm.

U.S. Pat. No. 6,008,728 issued to Akintunde O. Wesey on Dec. 28, 1999, describes a water level detection and alarm device used for bathtubs. The device comprises a housing which is secured to the interior surface of the tub and includes a float and water level alarm system which sounds an alarm when the water level in the tub reaches a predetermined level.

A tub alarm apparatus is described in U.S. Pat. No. 6,160,482 issued to Timothy W. Hill on Dec. 12, 2000. The alarm apparatus described therein includes a suction cup to be secured to the wall of the bathtub. An alarm housing is attached to the top of the suction cup, and an alarm system is located within the alarm housing. A float is supported by the alarm housing for activating the alarm when the water in the bathtub reaches a predetermined level.

U.S. Pat. No. 6,480,113 B1 issued to David W. Esposito on Nov. 12, 2002, describes a water level alarm system which comprises a housing, a float, a battery compartment, a speaker and an alarm. The housing is secured to the sides of the water container; the float rises with the water and when it reaches a certain level, makes contact with two separate conductors to complete a circuit and sound an alarm.

Thus, even though there are several prior art systems in use for controlling liquid levels in containers, most commonly in bathtubs, such systems are generally complicated to install and/or difficult to construct and operate. It would, therefore, be beneficial to provide a liquid level sensor which could be easily installed and easily adjusted to allow the user to properly control the sensing of the water.

SUMMARY OF THE INVENTION

One aspect of the invention is directed to a liquid level sensing device for sensing liquid in a container. The liquid level sensing device has a base and a rotatable member or tower which extends from and is rotatable relative to the base. A cord extends from the rotatable member and has a sensor provided at a free end thereof. An engagement portion is positioned on the rotatable member and an engagement projection extends from the base. The engagement projection is positioned to engage the engagement portion to allow the cord and the sensor to be accurately positioned relative to the base. The sensor may be accurately positioned at various heights relative to a bottom of the container to allow a user to fill the container with liquid to the desired level.

Another aspect of the invention is directed to a liquid level sensing device which has an alarm provided in electrical communication with the sensor, such that as a liquid is introduced to the container, the alarm will be activated when the level of the liquid reaches the sensor.

Another aspect of the invention is directed to a liquid level sensing device which has a signal transmitter provided in electrical communication with the sensor, such that as a liquid is introduced to the container, the signal transmitter will be activated when the level of the liquid reaches the sensor and will communicate the same to a respective signal receiver positioned remote from the signal transmitter.

The engagement portion may be a ring mounted on the tower, with the ring being spaced from the base. The ring may have recesses and peaks provided around the circumference thereof. The engagement projection may be a post which extends from the base, and the post may have an engagement section which cooperates with the recesses and peaks of the ring of the rotatable member tower, whereby as the rotatable member is turned, the engagement section of the post will cooperate with peaks and recesses of the ring to provide an audible and tactile signal that the rotatable member is turning.

The rotatable member may be resiliently biased away from the base to initially position the peaks and recesses of the ring of the rotatable member in engagement with the engagement projection. When the rotatable member is pushed downward toward the base, the ring of the rotatable member is positioned below the engagement section of the post, so that as the rotatable member is rotated, the engagement section will not contact any part of the ring, thereby allowing the rotatable member to be rotated freely to quickly wrap the cord around the rotatable member and raise the sensor.

A soap dispenser may be positioned in the rotatable member. The soap dispenser may have a dispensing device and a reservoir in which liquid soap is stored, whereby upon activation of the dispensing device, the liquid soap flows from the reservoir, through a liquid soap dispensing tube, and into the container. Alternatively, a candle or other such auxiliary product may be positioned in the rotatable member.

The sensor may have two exposed conductors which are equally spaced from the rotatable member. When the liquid reaches the ends of the conductors, the alarm is activated to indicate that the level of the liquid has reached the conductors.

The sensor may have two exposed conductors which are equally spaced from the rotatable member. When the liquid reaches the ends of the conductors, the signal transmitter is activated to indicate that the level of the liquid has reached the conductors.

Other features and advantages of the present invention will be apparent from the following more detailed description of the preferred embodiment, taken in conjunction with the accompanying drawings which illustrate, by way of example, the principles of the invention.

DESCRIPTION OF THE INVENTION

Figure 1:
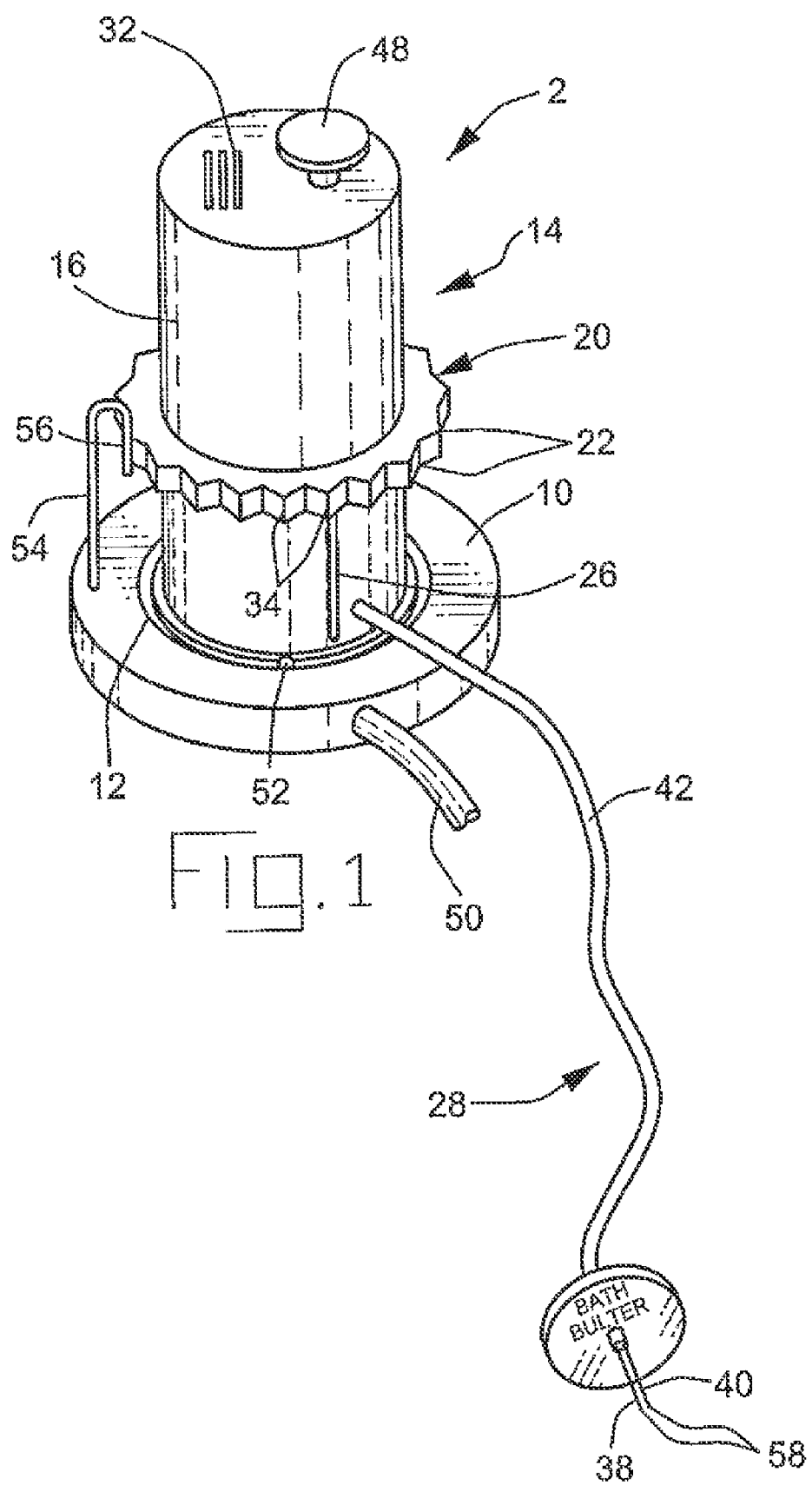
FIG. 1 is a perspective view of one embodiment of the liquid level sensor of the present invention.

Referring to the drawings, a liquid level sensing device 2 which can be used to sense the level of liquid in a large container, tank or tub, such as a bathtub or the like, is shown. A portion of the liquid level sensing device 2 hangs over the side of the container and produces a signal when the liquid placed in the tub reaches a particular level. The liquid level sensing device 2 may be provided with other features to enhance the experience of the user.

Figure 3:
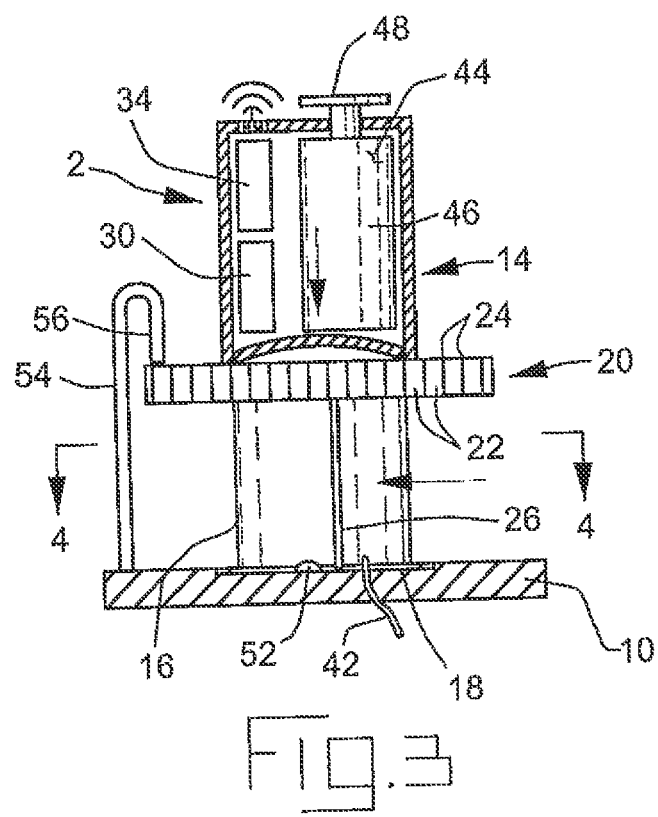
FIG. 3 is a partial cross-sectional view of the liquid level sensor of FIG. 1, with a rotatable member depressed so that a ring is disengaged from an engagement portion of a post.

FIG. 1 shows a perspective view of the liquid level sensing device 2 according to the invention. The liquid level sensing device has a base 10 with an opening 12 provided therein. In the embodiment shown, the base 10 and the opening 12 have cylindrical configurations, but the invention is not limited to the base 10 and opening 12 being cylindrical. A rotatable member 14 extends axially from the opening 12 away from the base 10. In the embodiment shown, the rotatable member 14 is inserted into the opening 12 through a bottom of the base 10. The rotatable member 14 has a cylindrical tower 16 which extends from a tower base 18 (FIG. 3). The cylindrical tower 16 is dimensioned to be received in and extend through the opening 12 in a direction away from the bottom of the base 10. The tower base 18 is dimensioned to be larger than the opening 12, such that as the rotatable member 14 is inserted into the base 10 from the bottom surface, the tower base 10 will be prevented from moving through the opening 12.

The rotatable member 14 has a ring 20 which is integral or mounted on the tower 16. The ring 20 is spaced from the tower base 18 and has recesses 22 and peaks 24 provided around the circumference thereof. Positioned between the ring 20 and the tower base 18 is a fast take-up device 26. In the embodiment shown, the fast take-up device 26 is a projection which extends outward from the surface of the tower 16, but other configurations can be used. The recesses 22 and peaks 24 are used to properly position the rotatable member 14 and the sensor 28 (FIG. 1) that extends therefrom, as will be more fully described below.

Figure 2:
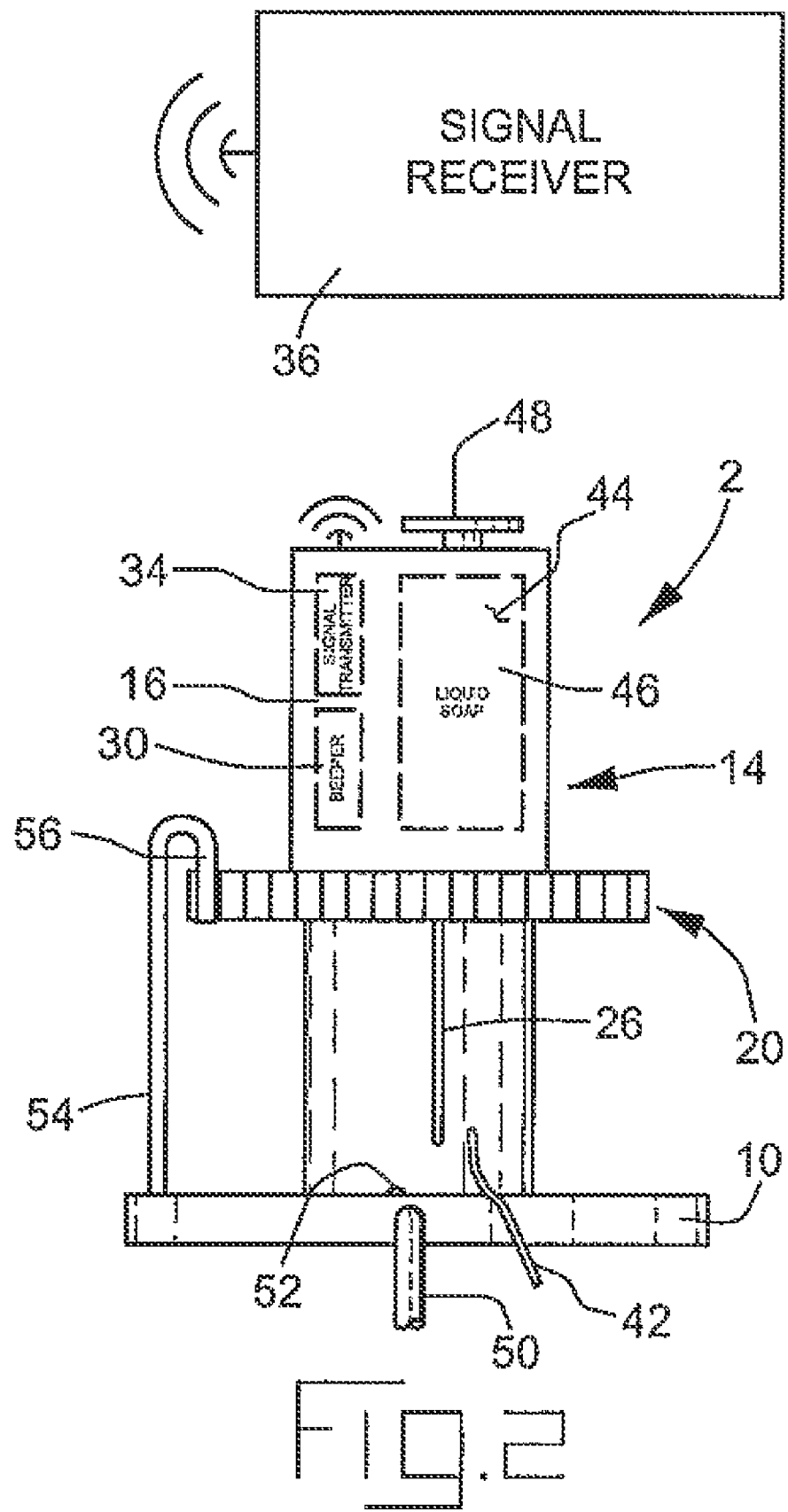
FIG. 2 is a side view of the liquid level sensor of FIG. 1 with various internal components indicated by dotted lines, depicting the wireless communication which can be used with the liquid level sensor.

Referring to FIG. 2, the liquid level sensing device 2 may have an audible warning or alarm device 30 positioned in the interior of the cylindrical tower 16. The alarm device 30 may be of the type known in the industry which produces an audible noise or vibration when electrical current is supplied thereto. Openings 32 (FIG. 1) extend through the top surface of the tower 16 which facilitates the transmission and propagation of the noise or sound generated by the alarm device 30. The tower 16 may also have a signal transmitter 34 which can communicate with a signal receiver 36 positioned remote from the signal transmitter 34. The signal transmitter and associated antenna 34 and signal receiver and associated antenna 36 can be of any type known in the industry. A circuit board, not shown, or the like is positioned in the tower 16 and is provided in electrical engagement with the alarm device 30 and the signal transmitter 34. Although a circuit board is referred to, other types of circuitry can be used without departing from the scope of the invention. The circuit board is in electrical contact with a battery (not shown) or other power source which is positioned in the tower 16 or with a power source which is external to the tower 16. The circuit board is also in electrical engagement with a first conductor 38 and a second conductor 40, as best shown in FIG. 1. The conductors 38, 40 extend from the tower 16 through a cord 42 to form the liquid sensor 28. The first and second conductors 38, 40 are made from metal or other conductive material which will resist corrosion due to moisture.

A liquid oil or soap dispenser 44 may also be positioned in the tower 16. The soap dispenser 44 has a reservoir 46 in which the liquid soap is stored. To dispense the liquid soap, the soap button 48 is depressed. This allows the liquid soap to flow from the reservoir 46, through the liquid soap dispensing tube 50, and into the container or tub. Alternatively, or in addition to the soap dispenser 44, other ancillary products may be provided, such as a candle, lighting, etc.

As best shown in FIGS. 1-3 and 5, the base 10 has a fast take-up projection 52 which extends upward from the base 10. The fast take-up projection 52 is proximate the opening 12 of the base 10 and is positioned to cooperate with the fast take-up device 26 under certain conditions. A post 54 extends from the base 10 toward the plane of the top surface of the tower 16. The post 54 has an engagement portion 56 which cooperates with the recesses 22 of the ring 20 of the tower 16. In the embodiment shown, the post 54 has a cane type configuration, but other configurations can be used without departing from the scope of the invention.

It should be noted that the positioning of the ends 58 of the first and second conductors 38, 40 with respect to the rotatable member 14 is important to understand. As will be more fully described, the positioning of the end 58 of the first and second conductors 38, 40 with respect to the rotatable member 14 governs the amount of liquid that can be poured into the container or tub prior to the alarm device 30 or the signal transmitter 34 being activated.

The liquid level sensing device 2 is positioned on a surface proximate a sidewall of the tub. The base 10 of the liquid level sensing device 2 may be permanently mounted or removably mounted to the surface. With the base 10 properly mounted, the cord 42 is positioned to hang in the tub, proximate the side surface. As shown in FIG. 1, the first and second conductors 38, 40 are exposed at the end 58 of the cord 42.

Figure 4:
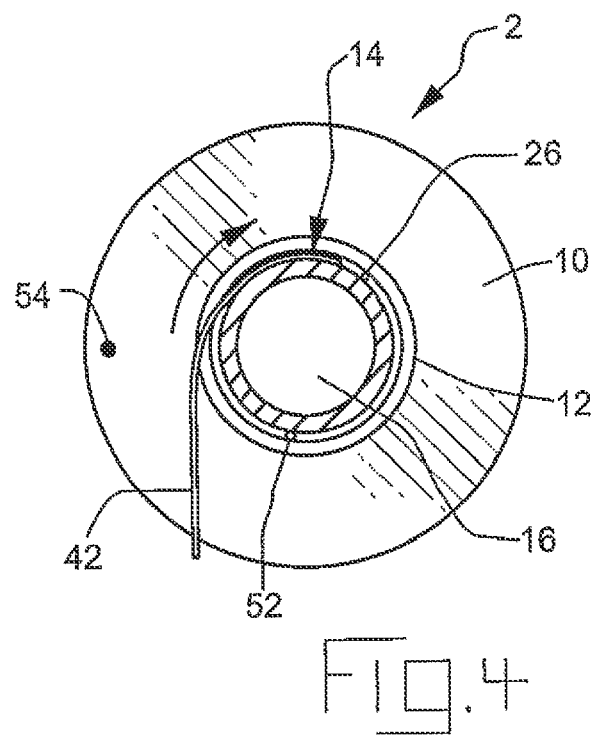
FIG. 4 is a cross-sectional view of the liquid level sensor of FIG. 3 taken along line 4-4 of FIG. 3.

Depending on the tub and the user, the level of water which the user wants to be placed in the tub can vary, i.e. the desired water level for a child may be less than the water level for an adult. With the base 10 and rotatable member 14 properly mounted, the rotatable member 14 can be rotated, causing the cord 42 to be wrapped about an outside surface of the tower 16 and causing the exposed conductors 38, 40 to be moved upward. If it is desired to move the exposed conductors 38, 40 a significant amount, the rotatable member 14 may be rotated quickly, as shown in FIGS. 3 and 4. In order to accomplish this fast rotation, the rotatable member 14 is pushed downward toward the base, as indicated by arrow A of FIG. 3. This allows the rotatable member 14 to move relative to the base 10 to the position, as indicated by arrow B of FIG. 3 and arrow C of FIG. 4. In this position, the ring 20 of the tower 16 is positioned below the engagement portion 56 of the post 54, so that as the tower 16 is rotated, the engagement projection 56 will not contact any part of the ring 20. This allows the tower 16 to be rotated freely to quickly wrap the cord 42 and raise the exposed conductors 38, 40. During this process the fast take-up device 26 will engage the fast take-up projections 52 as each full rotation of the tower 16 is complete, thereby providing a signal (whether audible or tactile) to facilitate the use of the liquid level sensing device 2 by persons who have impaired eyesight. Each rotation of the tower 16 causes the ends 58 of the conductors 38, 40 to be raised a distance essentially equal to the circumference of the tower 16.

Figure 5:
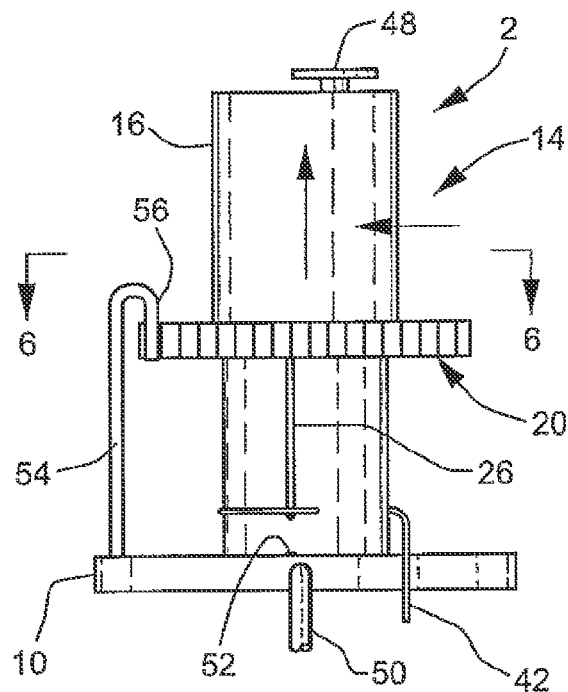
FIG. 5 is a side view of the liquid level sensor of FIG. 1 with the rotatable member rotated and returned to its original position in which the ring is engaged with the engagement portion of the post.
Figure 6:
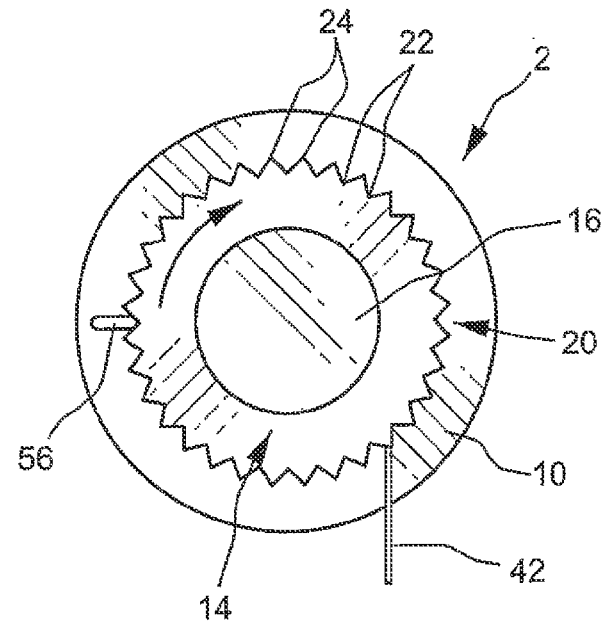
FIG. 6 is a cross-sectional view of the liquid level sensor of FIG. 5 taken along line 6-6 of FIG. 5.

As the height of the exposed conductors 38, 40 approaches the desired level, the user removes the downward pressure on the tower 16, as indicated by arrow D of FIG. 5. This allows the tower 16 to return to its initial position, in which the ring 20 engages the engagement portion 56 of the post 54. The tower 16 may be resiliently biased toward this position by the use of springs or other known methods. In this position, as shown in FIGS. 5 and 6, the rotation of the rotatable member 14 in the direction indicated by arrow E of FIG. 6 causes the ring 20 of the tower 16 to engage the engagement portion 56 of the post 54. Consequently, as the rotatable member 14 is turned, the engagement portion 56 of the post 54 will cooperate with peaks 24 of the ring 20 to provide an audible and tactile signal that the tower 16 is turning. The signal can be an audible sound or a physical release as the engagement portion 56 passes a respective peak 24. The noise and feel of the cooperation of the engagement portion 56 with the ring 20 can be varied based on the resiliency of the engagement portion 56 and the configuration of the peaks 24 and recesses 22. When the appropriate level for the exposed conductors 38, 40 is reached, the turning of the tower 16 is stopped and the engagement portion 56 is positioned in a respective recess 22 of the ring 20 to maintain the ring 20, the tower 16 and the exposed ends 58 of the conductors 38, 40 in proper position.

As an example, a liquid level sensing device 2 has a cord 42 length of 24 inches and a tower 16 circumference of 5 inches. The cord 42 extends from the tower 16 at approximately 2 inches above the bottom of the base 10. The ring 20 of the tower 16 has ten peaks 24 which are spaced 0.5 inches apart. The liquid level sensing device 2 is positioned at the edge of the sidewall of the tub. Therefore, the cord 42 initially extends 22 inches into the tub. If the user wants the water to fill to 8 inches from the rim, the user would push down on the rotatable member 14 and rotate the rotatable member 14 two full turns to quickly raise the ends 58 of the conductors 38, 40 10 inches (2×5 inch circumference), as was previously discussed. The ends 58 of the conductors 38, 40 are now positioned 12 inches from the rim. The rotatable member 14 is then returned to its initial position in which the ring 20 of the tower 16 engages the engagement member 56 of the post 54. The tower 16 is turned until the engagement member 56 passes 8 peaks 24 to raise the ends 58 of the conductors 38, 40 an additional 4 inches (8×0.5 inches). The ends 58 of the conductors 38, 40 are now positioned at 8 inches from the rim.

When the liquid in the tub reaches the ends 58 of the conductors 38, 40, the alarm device 30 and/or the signal transmitter 34 is activated to indicate that the level of the liquid has reached the ends of the conductors 38, 40, and therefore the desired level of the liquid has been reached. This occurs because the ends of the conductors 38, 40 act as a bridge circuit. The conductors 38, 40, which are electrically connected by way of the circuit board to the power source, have a respective positive and negative charge provided thereon. When in air, the circuit across the exposed conductors 38, 40 is open, as an electrical measuring resistance develops between the exposed conductors 38, 40. Since the air is not a good conductor of electricity, the charge on the conductors 38, 40 does not bridge across the conductors 38, 40. However, liquid has a different electrical resistance and conducts electricity much better. Therefore, the introduction of liquid between the exposed conductors 38, 40 allows the charge to bridge the conductors 38, 40, completing the circuit, which in turns allows electricity to flow to the alarm device 30 and/or the signal transmitter 34, thereby activating the alarm device 30 and/or the signal transmitter 34.

The use of the alarm device 30 provides notification of the liquid level to a user who is within audible range of the liquid level sensing device 2. Consequently, if the user is distracted or the user's eyesight is impaired, the alarm device 30 provides proper notification. The use of such signal transmitters 34 and receivers 36 can provide notification to users who are outside the range of an audible alarm. This allows the user the freedom to conduct other tasks while effectively monitoring the level of the water.

A temperature sensor may also be provided in the liquid level sensing device 2. With the ends 58 of the first and second conductors 38, 40 positioned in the liquid, the ends, in communication with the temperature sensor, will measure the temperature of the liquid. The temperature sensor can be programmed to provide an audible or remote alert through the alarm device 30 and/or signal transmitter 34 when the desired temperature range is reached. The desired temperature may be varied according to body weight or other user variables or according to user preference. As an example, a first acceptable temperature range may be programmed for an adult of greater than 75 pounds, a second acceptable temperature range may be programmed for a child of between 75 pounds and 25 pounds and a third acceptable temperature range may be programmed for a baby of less than 25 pounds. The temperature sensor may also provide a warning or alarm through the alarm device 30 and/or signal transmitter 34 when the temperature is outside of the desired temperature range to warn the user or caregiver of extreme temperatures which may be harmful to the user. The temperature at which the warning or alarm sounds may be programmed to be activated at a particular temperature no matter the weight or age of the user, or the temperature may be programmed according to other user variable as discussed above, or the temperature may be programmed according to the individual user's preferences.

Once the proper liquid level is reached, the ends 58 of the conductors 38, 40 are removed from the liquid and the alarm device 30 and/or signal transmitter 34 is deactivated. The ends 58 of the conductors 38, 40 can be removed from the liquid by merely pulling the cord 42 from the tub or by advancing the rotatable member 14 in a manner similar to that described above. In the alternative, the ends 58 of the conductors 38, 40 may remain in the liquid to continuously monitor the temperature of the liquid.

In order to reset or reuse the liquid level sensing device 2, the ends 58 of the conductors 38, 40 are placed back or repositioned into an empty tub. In order to return the liquid level sensing device 2 to its initial position, the rotatable member 14 is pushed downward toward the base. This allows the rotatable member 14 to move relative to the base 10, as previously described. In this position, the ring 20 of the tower 16 is positioned below the engagement portion 56 of the post 54, so that as the tower 16 is rotated, the engagement projection 56 will not contact any part of the ring 20. This allows the tower 16 to be rotated freely, in the opposite direction previously described, to lower the exposed conductors 38, 40 and return the cord 42 to its initial position. During this process the fast take-up device 26 will engage the fast take-up projections 52 as each full rotation of the tower 16 is complete, thereby providing a signal (whether audible or tactile) to facilitate the use of the liquid level sensing device 2 by persons who have impaired eyesight. Each rotation of the tower 16 causes the ends 58 of the conductors 38, 40 to be lowered a distance essentially equal to the circumference of the tower 16. With the cord 42 in the initial position, the process can be repeated.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A liquid level sensing device for sensing liquid in a container, the liquid level sensing device comprising:
   a base;
   a rotatable member extending from and rotatable relative to the base;
   a cord extending from the rotatable member, the cord having a sensor provided at a free end thereof;
   an alarm provided in electrical communication with the sensor, such that as a liquid is introduced to the container, the alarm will be activated when the level of the liquid reaches the sensor;
   engagement portion positioned on the rotatable member;
   an engagement projection extending from the base, the engagement projection being positioned to engage the engagement portion to allow the cord and the sensor to be accurately positioned relative to the base;
   whereby the sensor may be accurately positioned at various heights relative to a bottom of the container to allow a user to fill the container with the liquid to the desired level.

2. The liquid level sensing device as recited in claim 1, wherein the engagement portion is a ring mounted on the tower, the ring is spaced from the base and has recesses and peaks provided around the circumference thereof.

3. The liquid level sensing device as recited in claim 2, wherein the engagement projection is a post which extends from the base is a direction parallel to the rotatable member, the post has an engagement section which cooperates with the recesses and peaks of the ring of the rotatable member tower, whereby as the rotatable member is turned, the engagement section of the post will cooperate with peaks and recesses of the ring to provide an audible and tactile signal that the rotatable member is turning.

4. The liquid level sensing device as recited in claim 3, wherein a fast take-up device is positioned on the rotatable member between the ring and the base and a fast take-up projection is provided on the base.

5. The liquid level sensing device as recited in claim 4, wherein the rotatable member is resiliently biased away from the base to initially position the peaks and recesses of the ring of the rotatable member in engagement with the engagement projection, whereby when the rotatable member is pushed downward toward the base, the ring of the rotatable member is positioned below the engagement section of the post, so that as the rotatable member is rotated, the engagement section will not contact any part of the ring thereby allowing the rotatable member to be rotated freely to quickly wrap the cord around the rotatable member and raise the sensor.

6. The liquid level sensing device as recited in claim 1, wherein a signal transmitter is provided in the liquid level sensing device and is in electrical communication with the sensor, such that as a liquid is introduced to the container, the signal transmitter will be activated when the level of the liquid reaches the sensor and will communicate the same to a respective signal receiver positioned remote from the signal transmitter.

7. The liquid level sensing device as recited in claim 1, wherein a soap dispenser is positioned in the rotatable member, the soap dispenser has a dispensing device and a reservoir in which liquid soap is stored, whereby upon activation of the dispensing device, the liquid soap flows from the reservoir, through a liquid soap dispensing tube, and into the container.

8. The liquid level sensing device as recited in claim 1, wherein the sensor monitors the temperature whereby the alarm will be activated when a programmed temperature is reached.

9. The liquid level sensing device as recited in claim 1, wherein the sensor has two exposed conductors which are equally spaced from the rotatable member, whereby when the liquid reaches the ends of the conductors, the alarm is activated to indicate that the level of the liquid has reached the conductors.

10. The liquid level sensing device as recited in claim 9, wherein the engagement portion is a ring mounted on the tower, the ring is spaced from the base and has recesses and peaks provided around the circumference thereof.

11. The liquid level sensing device as recited in claim 10, wherein a fast take-up device is positioned on the rotatable member between the ring and the base and a fast take-up projection is provided on the base.

12. The liquid level sensing device as recited in claim 9, wherein a soap dispenser is positioned in the rotatable member, the soap dispenser has a dispensing device and a reservoir in which liquid soap is stored, whereby upon activation of the dispensing device, the liquid soap flows from the reservoir, through a liquid soap dispensing tube, and into the container.

13. A liquid level sensing device for sensing liquid in a container, the liquid level sensing device comprising:
   a base;
   a rotatable member extending from and rotatable relative to the base;
   a cord extending from the rotatable member, the cord having a sensor provided at a free end thereof;
   a signal transmitter is provided in the liquid level sensing device and is in electrical communication with the sensor, such that as a liquid is introduced to the container, the signal transmitter will be activated when the level of the liquid reaches the sensor and will communicate the same to a respective signal receiver positioned remote from the signal transmitter;
   engagement portion positioned on the rotatable member;

an engagement projection extending from the base, the engagement projection being positioned to engage the engagement portion to allow the cord and the sensor to b accurately positioned relative to the base;

whereby the sensor may be accurately positioned at various heights relative to a bottom of the container to allow a user to fill the container with the liquid to the desired level.

14. The liquid level sensing device as recited in claim 13, wherein the engagement projection is a post which extends from the base is a direction parallel to the rotatable member, the post has an engagement section which cooperates with the recesses and peaks of the ring of the rotatable member tower, whereby as the rotatable member is turned, the engagement section of the post will cooperate with peaks and recesses of the ring to provide an audible and tactile signal that the rotatable member is turning.

15. The liquid level sensing device as recited in claim 14, wherein the rotatable member is resiliently biased away from the base to initially position the peaks and recesses of the ring of the rotatable member in engagement with the engagement projection, whereby when the rotatable member is pushed downward toward the base, the ring of the rotatable member is positioned below the engagement section of the post, so that as the rotatable member is rotated, the engagement section will not contact any part of the ring thereby allowing the rotatable member to be rotated freely to quickly wrap the cord around the rotatable member and raise the sensor.

16. The liquid level sensing device as recited in claim 13, wherein the sensor monitors the temperature whereby the signal transmitter will be activated when a programmed temperature is reached.

17. A liquid level sensing device for sensing liquid in a container, the liquid level sensing device comprising:
a base;
a rotatable member extending from and rotatable both axially and radially relative to the base;
a cord extending from the rotatable member, the cord having a sensor provided at a free end thereof;
engagement portion positioned on the rotatable member;
an engagement projection extending from the base, the engagement projection being positioned to engage the engagement portion to allow the cord and the sensor to be accurately positioned relative to the base;
whereby the sensor may be accurately positioned at various heights relative to a bottom of the container to allow a user to fill the container with the liquid to the desired level.

18. The liquid level sensing device as recited in claim 17, wherein a soap dispenser is positioned in the rotatable member, the soap dispenser has a dispensing device and a reservoir in which liquid soap is stored, whereby upon activation of the dispensing device, the liquid soap flows from the reservoir, through a liquid soap dispensing tube, and into the container.

19. The liquid level sensing device as recited in claim 17, wherein a liquid oil dispenser is positioned in the rotatable member, the liquid oil dispenser has a dispensing device and a reservoir in which liquid oil is stored, whereby upon activation of the dispensing device, the liquid oil flows from the reservoir, through a liquid oil dispensing tube, and into the container.

20. The liquid level sensing device as recited in claim 17, wherein a candle is positioned in the rotatable member.

* * * * *